United States Patent
Zhu et al.

(10) Patent No.: US 10,544,065 B2
(45) Date of Patent: Jan. 28, 2020

(54) ORGANIC-INORGANIC POLYMERIC WATER-RETAINING FERTILIZER AND PREPARATION METHOD OF THE SAME

(71) Applicant: QINGDAO XINYAODI AGRICULTURAL TECHNOLOGY JOINT-STOCK CO., LTD., Qingdao, Shandong (CN)

(72) Inventors: Yanfang Zhu, Qingdao (CN); Zhiyong Du, Qingdao (CN); Hongzhi Zhu, Qingdao (CN)

(73) Assignee: QINGDAO XINYAODI AGRICULTURAL TECHNOLOGY JOINT-STOCK CO., LTD., Qingdao, Shandong (CN)

( * ) Notice: Subject to any disclaimer, the term of this patent is extended or adjusted under 35 U.S.C. 154(b) by 116 days.

(21) Appl. No.: 15/746,962

(22) PCT Filed: Jun. 30, 2017

(86) PCT No.: PCT/CN2017/091230
§ 371 (c)(1),
(2) Date: Jan. 23, 2018

(87) PCT Pub. No.: WO2018/001366
PCT Pub. Date: Jan. 4, 2018

(65) Prior Publication Data
US 2018/0354869 A1    Dec. 13, 2018

(30) Foreign Application Priority Data

Jul. 1, 2016    (CN) .......................... 2016 1 0512162

(51) Int. Cl.
*C05F 11/08*     (2006.01)
*C08F 220/06*   (2006.01)
(Continued)

(52) U.S. Cl.
CPC ................ *C05F 11/08* (2013.01); *C05B 7/00* (2013.01); *C05G 3/0058* (2013.01); *C05G 3/04* (2013.01);
(Continued)

(58) Field of Classification Search
CPC ........ C05F 11/08; C05F 2/001; C08F 292/00; C08F 2/10; C08F 220/06; C05G 3/0058;
(Continued)

(56) References Cited

FOREIGN PATENT DOCUMENTS

| CN | 1158217 | 9/1997 |
|---|---|---|
| CN | 1371892 | 10/2002 |

(Continued)

OTHER PUBLICATIONS

English Translation of QingDao CN 104119468 Oct. 29, 2014.*
(Continued)

*Primary Examiner* — Jennifer A Smith
(74) *Attorney, Agent, or Firm* — Hogan Lovells US LLP

(57) ABSTRACT

Provided is an organic-inorganic polymeric water-retaining fertilizer, which is a co-polymer made by fusion and co-polymerization of an organic water-retaining monomer and an inorganic nutrient under action of a catalyst, a biological enzyme and a modifying agent. The co-polymer is of a three-dimensional mesh-like hydrophilic group structure. In a method for preparing the organic-inorganic polymeric water-retaining fertilizer, after obtaining a neutralized pre-polymer from the organic monomer with the catalyst, an initiator and a cross-linking agent are added; the inorganic nutrient and a metasilicate are added simultaneously, a solution is formed by stirring sufficiently; the biological enzyme is added for catalysis; a co-polymer is obtained after fusion and co-polymerization; and granulation and drying are carried out. Preferably, the catalyst is an inorganic alkaline solution. Preferably, the catalyst is selected from the
(Continued)

group consisting of a sodium hydroxide solution, a potassium hydroxide solution, an ammonia water and a calcium hydroxide solution.

15 Claims, 2 Drawing Sheets

(51) Int. Cl.
    *C08K 3/30* (2006.01)
    *C08K 3/38* (2006.01)
    *C05G 3/04* (2006.01)
    *C05B 7/00* (2006.01)
    *C05G 3/00* (2006.01)
    *C08F 2/00* (2006.01)
    *C08F 2/10* (2006.01)
    *C08F 292/00* (2006.01)
    *C08K 3/28* (2006.01)
    *C08K 3/32* (2006.01)
    *C08K 5/21* (2006.01)

(52) U.S. Cl.
CPC .............. *C08F 2/001* (2013.01); *C08F 2/10* (2013.01); *C08F 220/06* (2013.01); *C08F 292/00* (2013.01); *C08K 3/28* (2013.01); *C08K 3/30* (2013.01); *C08K 3/32* (2013.01); *C08K 3/38* (2013.01); *C08K 5/21* (2013.01); *C08K 2003/287* (2013.01); *C08K 2003/3045* (2013.01); *C08K 2003/322* (2013.01); *C08K 2003/387* (2013.01)

(58) Field of Classification Search
CPC ... C05G 3/04; C08K 3/28; C08K 5/21; C08K 3/32; C08K 2003/322; C08K 2003/287; C05B 7/00
See application file for complete search history.

(56) References Cited

FOREIGN PATENT DOCUMENTS

| | | |
|---|---|---|
| CN | 103865002 | 6/2014 |
| CN | 103896691 | 7/2014 |
| CN | 103910819 | 7/2014 |
| CN | 104119468 | 10/2014 |
| CN | 104119481 | 10/2014 |
| CN | 106146156 | 11/2016 |
| WO | 2013111762 | 8/2013 |

OTHER PUBLICATIONS

English Translation of Liu et al. CN 1158217 Sep. 3, 1997.*
International Search Report issued in Internal Application No. PCT/CN2017/091230 dated Sep. 27, 2017.

* cited by examiner

ORGANIC-INORGANIC POLYMERIC WATER-RETAINING FERTILIZER AND PREPARATION METHOD OF THE SAME

CROSS REFERENCE TO RELATED APPLICATION

The present application claims priority to Chinese Patent Application No. 201610512162.2 filed with China Patent Office on Jul. 1, 2016, and entitled "An Organic-Inorganic Polymeric Water-Retaining Fertilizer and Preparation Method of the Same", which is incorporated herein by reference in its entirety.

TECHNICAL FIELD

The present invention relates to the field of fertilizer, and particularly to an organic-inorganic polymeric water-retaining fertilizer and preparation method of the same.

BACKGROUND ART

The present invention relates to a method of preparing an organic-inorganic polymeric water-retaining fertilizer. Through a reaction in which a macromolecular water-absorbing resin and an inorganic nutrient factor are fused and co-polymerized, a novel water-fertilizer-retaining material is made, well, this material has functions of integrating of water and fertilizer as well as retaining of both water and fertilizer, functions of sustained releasing synchronously as well as double controlled releasing of both water and fertilizer, a function of resisting to pests and diseases, a function of regulating of soil, etc.

Related technical indexes: content of organic matter is ≥20%; water absorbency is of 10 g/g-20 g/g; the total content of nutrients of nitrogen, phosphorus and potassium is 35%-40%; the total content of nutrients of secondary elements of calcium, magnesium, silicon and sulfur are ≥5%; the release rate of nutrients at the initial stage is ≤15%. (Executive Standard of "Organic-inorganic Polymeric Water-retaining Fertilizer" of the present enterprise: Q/370203XYD 001-2016).

Chemical fertilizers are the largest material investment in agricultural production globally. According to the statistical information from Food and Agriculture Organization of the United Nations, in terms of improving the unit yield, the effect of chemical fertilizers on yield increase accounts for 40%-60%. The production practice shows, however, that the utilization rate of chemical fertilizers is quite low due to the combined influences of the properties of the chemical fertilizer itself, environmental conditions of soils and agricultural practice. The waste of nutrient resources in China is quite astonishing as a result of the low utilization rate of the nutrients of the fertilizers. The newest data from authorities reveals that, due to the blind and excessive fertilization by peasants in China, the direct economic loss reaches 650 CNY per hectare, with an environmental cost being approximately 73 billion CNY and annual flow-away of fertilizers being more than 110 billion CNY. It has been a commonly concerned problem among countries worldwide regarding how to improve the utilization rate of chemical fertilizers, to reduce the problem of environmental pollution caused by inadequate fertilization, and to develop high-efficiency agriculture in a sustainable manner.

Since the beginning of the 21$^{st}$ century, the development, preparation and application of water-retaining fertilizers have offered a new idea for solving this problem. The development and preparation of an integration of a water-retaining agent and a fertilizer have become a cutting-edge technological hotspot for researches on fertilizer worldwide, and the technologies of organic-inorganic combining and coating have been developed. Ever since the development and preparation of the water-retaining sustained- and controlled-release fertilizer, the technology of sustained release by compounding water-retaining agents and inorganic nutrients as well as the technology of sustained release by coating with water-retaining agents have undergone applications and development. Based on the development progress, there are representative categories for modern technologies of resin coating as follows. One of the representative categories is the technology of sustained release by compounding water-retaining agents and inorganic nutrients. The key technology thereof is the ratio for preparing and compounding the water-retaining agents and the inorganic nutrients. Since the technology employs a physical blending of the water-retaining factor and the inorganic nutrient factor, the property of sustained release for nutrient thereof is restrained; and due to the high cost of the water retaining agent, it fails to be applied to the actual production in large areas.

Another representative categories is the technology of sustained release by coating with water-retaining agents. The key technology thereof is to uniformly wrap the core of the fertilizer with a water-retaining agent under particular facilities; or alternatively to firstly wrap the core of the fertilizer with a layer of water-blocking sustained-release coating so as to firstly achieve a function of sustained release of the nutrients, followed by wrapping the outermost layer with a coating of water-retaining agent so as to achieve a function of water retention. Nevertheless, since the water-retaining agent occupies a low proportion within the fertilizer for this kind of coating-type products, the water absorbency is restrained, the sustained release of the nutrient and the sustained release of water are unsynchronized, and the cost for coating is too high. As a result, it is difficult to be applied to the agricultural production.

The technology of combined fertilizer is a technology of organic-inorganic fusion and co-polymerization. The principle of the same is a novel structure substance obtained from organic-inorganic fusion and co-polymerization; the substance is a three-dimensional mesh-like structure hydrophilic group produced from ingenious fusion and co-polymerization of an organic water-retaining factor and an inorganic nutrient factor. It is capable of biodegradable, sustained and controlled release, double retention and double controlled release, integration of water and fertilizer, synchronization of sustained release, resistance to pests and insects, conservation of soils, optimization of microecological environment, improvement of soils, soil fertilizer efficiency, improvement of nutrition and health in human bodies. This fundamentally achieve the strategic objectives of "one saving two reductions" (water saving, fertilizer reduction and pesticide reduction) for the agricultural sustainable development, as advocated in China.

Both of the aforementioned technologies of compounding and coating for water-retaining sustained- and controlled-release fertilizers have their pros and cons, and are not able to achieve a desirable effect in practical production. The organic-inorganic fusion co-polymerization technology has the following advantages: low cost in production, excellent quality with reasonable price; labor-saving and time-saving, energy-saving and beneficial to the environment; nontoxic and harmless, biodegradable, no residuals left; non-volatile, no flow-away; non-combustible, non-explosive; safe for storage and effective in long term; and safe and reliable quality.

In view of these, the present invention is proposed specifically.

DISCLOSURE OF THE INVENTION

The first object of the present invention is to provide an organic-inorganic polymeric water-retaining fertilizer. The organic-inorganic polymeric water-retaining fertilizer contains a biological enzyme, which can activate the biologically active components in the soil and enhance the fertilizer efficiency.

The second object of the present invention is to provide a method for preparing the organic-inorganic polymeric water-retaining fertilizer. The method is of low cost, energy saving and beneficial to the environment.

In order to achieve the aforementioned objects, the following technical solutions are particularly employed.

In one aspect, the present invention relates to an organic-inorganic polymeric water-retaining fertilizer, the organic-inorganic polymeric water-retaining fertilizer is a co-polymer made by fusion and co-polymerization of an organic water-retaining monomer and an inorganic nutrient under the action of a catalyst, a biological enzyme and a modifying agent. The co-polymer is of a three-dimensional mesh-like hydrophilic group structure.

In the organic-inorganic polymeric water-retaining fertilizer of the present invention, the water-absorbing polymer, the inorganic nutrient and the biological enzyme are chemically bonded as a whole. With the help of the three-dimensional mesh-like structure of the water-absorbing polymer, the water retention, the sustained release and the prolongation of the acting time of the fertilizer are achieved.

In another aspect, the biological enzyme as added by the present invention can activate benignant microorganisms in the soil and promote the growth of crops, serving the auxiliary function of enhancing the fertilizer efficiency. In addition, the biological enzyme as added by the present invention was confirmed by infrared spectra to form a chemical bond with other components, thus serving the function of sustained release and long-acting.

Preferably, the organic-inorganic polymeric water-retaining fertilizer is mainly made by fusion and co-polymerization of the organic water-retaining monomer, the biological enzyme and the inorganic nutrient; and the monomer includes one selected from the group consisting of an acrylic acid and a derivative of the same. Preferably, the monomer is acrylic acid.

Preferably, the inorganic nutrient includes one selected from the group consisting of calcium magnesium nitrate, urea, monoammonium phosphate and potassium salt; and preferably, the potassium salt includes one selected from the group consisting of a potassium sulfate and a potassium chloride.

Preferably, the biological enzyme includes one or more selected from the group consisting of protease, cellulase, lipase, pectinase and an enzyme from enzyme microorganisms; and more preferably, the biological enzyme includes two or more selected from the group consisting of protease, cellulase, lipase, pectinase and enzyme from enzyme microorganisms.

In a preferred embodiment of the present invention, the cooperative using of two or more of the biological enzymes can serve a better function of activating the microorganisms in the soil.

Preferably, the modifying agent includes two or more selected from the group consisting of protein powder, cellulase powder, pectin, lipid and starch.

The main effect of the modifying agent is for loading of biological enzymes. In addition, selection of a suitable modifying agent is also beneficial to the full release of the biological enzyme in practical applications of fertilizer.

Preferably, the organic-inorganic polymeric water-retaining fertilizer, weighed in parts by weight, includes 400-600 parts of organic monomer, 8900-9600 parts of inorganic nutrient, 50-100 parts of modifying agent and 5-15 parts of biological enzyme.

In comparison to the prior art, the present invention remarkably decreases the amount to be used of the organic monomer. Therefore, the reaction temperature is reduced and the cost of reaction can be potently controlled during the preparation process.

Preferably, the inorganic nutrients include the following components in parts by weight:

1700-1800 parts of urea;
1500-1600 parts of monoammonium phosphate;
3500-3600 parts of potassium sulfate;
1000-1100 parts of calcium nitrate;
1000-1100 parts of magnesium sulfate;
150-250 parts of sodium silicate;
30-80 parts of zinc sulfate; and
30-80 parts of sodium borate;

Preferably, the fertilizer has a pH of 3-8, a mass fraction of organic matter of more than 20%, a water absorbency of 10 g/g-20 g/g; the total content of nitrogen, phosphorous and potassium is 35%-40%; the total content of calcium, magnesium, silicon and sulfur is greater than 5%; and the release rate of nutrients at an initial stage is less than 15%.

In another aspect, the present invention relates to a method for preparing the organic-inorganic polymeric water-retaining fertilizer. After obtaining a neutralized pre-polymer from the water-retaining monomer under the action of the catalyst, the inorganic nutrient and a metasilicate are added; then an initiator and a cross-linking agent are added, a solution is formed by stirring sufficiently; the biological enzyme is added for catalysis; a co-polymer is obtained after fusion and co-polymerization; and granulation and drying are carried out; preferably, the catalyst is an inorganic alkaline solution; preferably, the catalyst is selected from the group consisting of a sodium hydroxide solution, a potassium hydroxide solution, an ammonia water and a calcium hydroxide solution.

A metasilicate is also added into the organic-inorganic polymeric water-retaining fertilizer of the present invention. The main effect of the metasilicate is (1) to supplement the nutritive element of silicon; and (2) to act as an auxiliary in the reaction, and to serve a certain function of catalyzing the reaction of the pre-polymer.

Preferably, the method includes the steps of:

1) mixing an acrylic acid and the catalyst, which react for 15-20 minutes to obtain the neutralized pre-polymer;

2) sequentially adding the inorganic nutrient, the cross-linking agent and the initiator into the neutralized pre-polymer; which react for 15 minutes under a temperature controlled at 65° C.-70° C., and lowering the temperature to 35° C.-55° C.;

3) stirring the mixture obtained in step 2) to form a solution; adding into the solution the modifying agent and the biological enzyme, which are stirred for 10-20 minutes to obtain the co-polymer;

4) making the co-polymer into granules by drying, grinding and sieving.

In comparison to the prior art, the present invention has beneficial effects as follows:

1) In the organic-inorganic polymeric water-retaining fertilizer of the present invention, a three-dimensional mesh-like structure is formed by the organic water-retaining factor and the inorganic nutrient factor, so as to serve the function of sustained releasing and water retaining;

2) the organic-inorganic polymeric water-retaining fertilizer of the present invention contains a biological enzyme, which can activate the biologically active components in the soil and enhance the fertilizer efficiency;

3) the content of the acrylic acid in the organic-inorganic polymeric water-retaining fertilizer of the present invention is low, and therefore the reaction can be done at a low temperature;

4) the preparation method of the present invention is of low cost, economical and beneficial to the environment.

BRIEF DESCRIPTION OF DRAWINGS

In order to more clearly illustrate the technical solutions in the examples of the present invention or in the prior art, drawings needed to be used in the description of the examples or in the prior art are briefly discussed below.

DETAILED DESCRIPTION OF EMBODIMENTS

Figure 1:
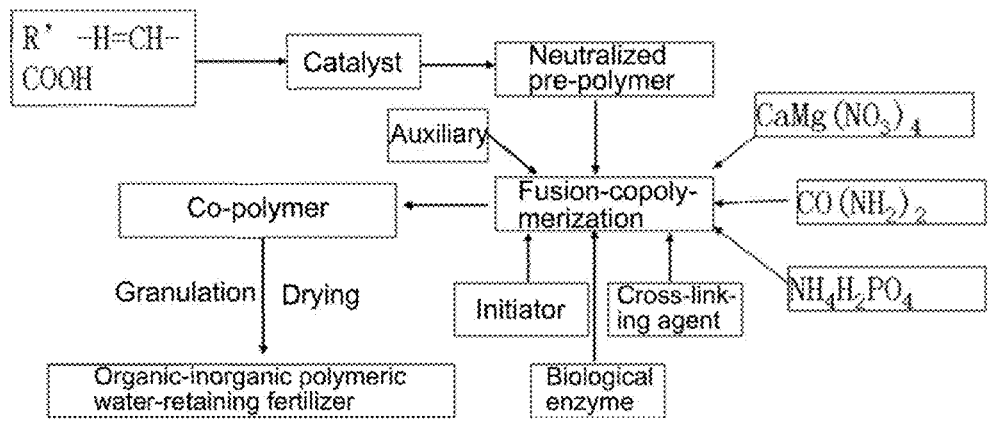
FIG. 1 is a schematic flow of production for the organic-inorganic polymeric water-retaining fertilizer of the present invention.

The embodiments of the present invention will be described in detail below in combination with the examples, but persons of skill in the art will understand that the examples are only used for illustration of the invention, and shall not be considered as limiting the scope of the present invention. Those for which a specific condition is not indicated in the examples are performed under conventional conditions or under the conditions suggested by the manufacturers. Those agents or instruments for which the manufacturer is not indicated are conventional available products that can be purchased on the market.

The calcium magnesium nitrate is a pure white crystal, which has a neutral pH, can be completely dissolved in water, and is easy to obtain. The fertilizer of the calcium magnesium nitrate is a total nitrate nitrogen type hydro-soluble fertilizer which supplies calcium and magnesium for crops.

The enzyme from enzyme microorganisms is a mixture of multiple biological enzymes generated from enzyme microorganism, which has a relatively strong catalytic activity and a function of promoting biochemical reactions. The enzyme microorganism is a beneficial microbial population which is used widely in fields of food processing, livestock and poultry production, pharmaceutical chemicals, etc., and the enzyme microorganism includes one or more selected from the group consisting of nitrogen-fixing bacteria, phosphorus bacteria, potassium bacteria, saccharomycetes, bacilli, photosynthetic bacteria, lactobacillus, etc.

Example 1

The following raw materials were prepared in parts by weight:

400 parts of acrylic acid;

an aqueous solution of sodium hydroxide as a catalyst, with a pH=8.5;

10 parts of potassium persulfate as an initiator;

20 parts of glycol as a cross-linking agent;

1700 parts of urea, 1500 parts of monoammonium phosphate, 3500 parts of potassium sulfate, 1000 parts of calcium nitrate, 1000 parts of magnesium sulfate, 150 parts of sodium silicate, 30 parts of zinc sulfate and 30 parts of sodium borate as inorganic nutrients;

5 parts of biological enzymes (2 parts of protease and 3 parts of cellulase);

25 parts of protein powder and 25 parts of cellulase powder.

The fertilizer was prepared in accordance with the steps of:

1) mixing acrylic acid and the catalyst, which react for 15 minutes to obtain a neutralized pre-polymer, followed by adding the inorganic nutrients into the reaction system;

2) sequentially adding the inorganic nutrients, the cross-linking agent and the initiator into the neutralized pre-polymer, which react for 15 minutes in the reaction system under a temperature controlled at 65° C.-68° C. with a rotational speed of stirring set at 70 revolutions; and lowering the temperature to 35° C.;

3) stirring the mixture obtained in step 2) to form a solution; adding into the solution the modifying agent and the biological enzymes, which are stirred for 10 minutes to obtain a co-polymer;

4) introducing the co-polymer into a granulating dryer to obtain an finished product of granular fertilizer.

Detected by the laboratory based on the enterprise's standard, the fertilizer prepared in accordance with the formulation has a pH of 6.5, a content of the organic matter of 20.5%, a water absorbency of 16.5 g/g; the total content of nitrogen, phosphorus and potassium is 37%, in which the content of nitrogen is 9.9%, of phosphorus pentoxide is 9.6%, of potassium oxide is 17.8%; the total content of calcium, magnesium, silicon and sulfur is 17.9%, in which calcium oxide is 2.1%, magnesium oxide is 1.5%, silicon dioxide is 0.02%, and sulfur dioxide is 14.3%; and the release rate of nutrients at the initial stage is 8.3%.

Example 2

The following raw materials were prepared in parts by weight:

600 parts of acrylic acid;

an aqueous solution of sodium hydroxide as a catalyst, with a pH=11.7;

20 parts of potassium persulfate as an initiator;

30 parts of glycol as a cross-linking agent;

1800 parts of urea, 1600 parts of monoammonium phosphate, 3600 parts of potassium sulfate, 1100 parts of calcium nitrate, 1100 parts of magnesium sulfate, 250 parts of sodium silicate, 80 parts of zinc sulfate and 80 parts of sodium borate as inorganic nutrients;

15 parts of biological enzymes (5 parts of lipase, 5 parts of pectinase and 5 parts of enzyme from enzyme microorganisms);

25 parts of lipid, 25 parts of pectin and 30 parts of starch.

The fertilizer was prepared in accordance with the steps of:

1) mixing acrylic acid and the catalyst, which react for 20 minutes to obtain a neutralized pre-polymer, followed by adding the inorganic nutrients into the reaction system;

2) sequentially adding the inorganic nutrients, the cross-linking agent and the initiator into the neutralized pre-polymer, which react for 25 minutes in the reaction system under a temperature controlled at 66° C.-70° C. with a rotational speed of stirring set at 80 revolutions; and lowering the temperature to 55° C.;

3) stirring the mixture obtained in step 2) to form a solution; adding into the solution the modifying agent and the biological enzymes, which are stirred for 20 minutes to obtain a co-polymer;

4) introducing the co-polymer into a granulating dryer to obtain an finished product of granular fertilizer.

Detected by the laboratory based on the enterprise's standard, the fertilizer prepared in accordance with the formulation has a pH of 6.9, a content of the organic matter of 24.1%, a water absorbency of 19.6 g/g; the total content of nitrogen, phosphorus and potassium is 39.4%, in which the content of nitrogen is 10.9%, of phosphorus pentoxide is 9.8%, of potassium oxide is 18.7%; the total content of calcium, magnesium, silicon and sulfur is 20.5%, in which calcium oxide is 2.1%, magnesium oxide is 1.9%, silicon dioxide is 0.05%, sulfur dioxide is 16.4%; and the release rate of the nutrients at the initial stage is 5.1%

Example 3

The following raw materials were prepared in parts by weight:
500 parts of acrylic acid;
an aqueous solution of sodium hydroxide as a catalyst, with a pH=9.5;
15 parts of potassium persulfate as an initiator;
25 parts of glycol as a cross-linking agent;
1750 parts of urea, 1550 parts of monoammonium phosphate, 3550 parts of potassium sulfate, 1050 parts of calcium nitrate, 1050 parts of magnesium sulfate, 200 parts of sodium silicate, 50 parts of zinc sulfate and 50 parts of sodium borate as inorganic nutrients;
10 parts of biological enzyme (10 parts of protease);
75 parts of protein powder.

The fertilizer was prepared in accordance with the steps of:

1) mixing acrylic acid and the catalyst, which react for 20 minutes to obtain a neutralized pre-polymer, followed by adding the inorganic nutrients into the reaction system;

2) sequentially adding the inorganic nutrients, the cross-linking agent and the initiator into the neutralized pre-polymer, which react for 20 minutes in the reaction system under a temperature controlled at 66° C.-70° C. with a rotational speed of stirring set at 80 revolutions; and lowering the temperature to 50° C.;

3) stirring the mixture obtained in step 2) to form a solution; adding into the solution the biological enzyme, which are stirred for 15 minutes to obtain a co-polymer;

4) introducing the co-polymer into a granulating dryer to obtain an finished product of granular fertilizer.

Detected by the laboratory based on the enterprise's standard, the fertilizer prepared in accordance with the formulation has a pH of 6.8, a content of the organic matter of 22.3%, a water absorbency of 17.3 g/g; the total content of nitrogen, phosphorus and potassium is 35.9%, in which the content of nitrogen is 9.2%, of phosphorus pentoxide is 9.4%, of potassium oxide is 17.3%; the total content of calcium, magnesium, silicon and sulfur is 17.9%, in which calcium oxide is 1.9%, magnesium oxide is 1.4%, silicon dioxide is 0.04%, sulfur dioxide is 15.2%; and the release rate of the nutrients at the initial stage is 7.2%

Example 4

The following raw materials were prepared in parts by weight:
400 parts of acrylic acid;
an aqueous solution of sodium hydroxide as a catalyst, with a pH=8.5;
10 parts of potassium persulfate as an initiator;
20 parts of glycol as a cross-linking agent;
1780 parts of urea, 1580 parts of monoammonium phosphate, 3580 parts of potassium sulfate, 1088 parts of calcium nitrate, 1088 parts of magnesium sulfate, 200 parts of sodium silicate, 50 parts of zinc sulfate and 50 parts of sodium borate as inorganic nutrients;
10 parts of biological enzymes (5 parts of protease, 3 parts of cellulase and 2 parts of enzyme from enzyme microorganisms);
30 parts of hydrolyzed protein powder of soybean, 20 parts of fish meal, and 10 parts of bone meal.

The fertilizer was prepared in accordance with the steps of:

1) mixing acrylic acid and the catalyst, which react for 15 minutes to obtain a neutralized pre-polymer, followed by adding the inorganic nutrients into the reaction system;

2) sequentially adding the inorganic nutrients, the cross-linking agent and the initiator into the neutralized pre-polymer, which react for 15 minutes in the reaction system under a temperature controlled at 66° C.-68° C. with a rotational speed of stirring set at 70 revolutions; and lowering the temperature to 50° C.;

3) stirring the mixture obtained in step 2) to form a solution; adding into the solution the biological enzymes and heating them to 45° C., and stirring the same for 10 minutes to obtain a co-polymer;

4) introducing the co-polymer into a granulating dryer to obtain an finished product of granular fertilizer.

Detected by the laboratory based on the enterprise's standard, the fertilizer prepared in accordance with the formulation has a pH of 6.5, a content of the organic matter of 21%, a water absorbency of 17.5 g/g; the total content of nitrogen, phosphorus and potassium is 40%, in which the content of nitrogen is 10.9%, of phosphorus pentoxide is 10.3%, of potassium oxide is 18.8%; the total content of calcium, magnesium, silicon and sulfur is 20.8%, in which calcium oxide is 2.6%, magnesium oxide is 1.9%, silicon dioxide is 0.04%, sulfur dioxide is 16.3%; and the release rate of nutrients at the initial stage is 7.8%

Experimental Example 1

Figure 2:
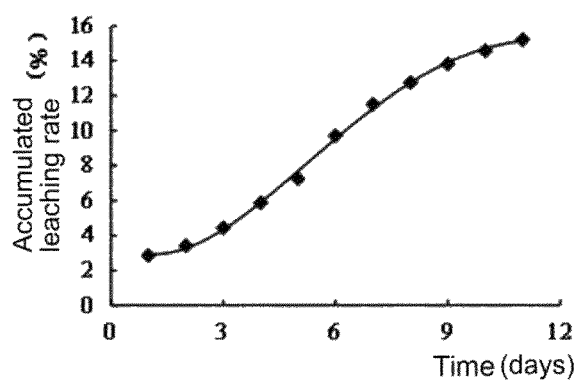
FIG. 2 shows leaching characteristics of the organic-inorganic polymeric water-retaining fertilizer of the present invention in a soil column.

Under a culture condition of soil column leaching, the sustained release period of the nutrients for the organic-inorganic polymeric water-retaining fertilizer prepared by the method of Example 4 is 80 days, and the characteristic curve for the sustained release property of the total nutrients of the combined fertilizer presents an "S" shape (see FIG. 2). The release characteristic of the fertilizer in the soil presents a long-lasting sustained release property, which indicates that the application of the fertilizer in the soil is benefit to the stability and sustained release of the nutrients.

The fertilizer was measured by a method for measuring a water absorbency of organic-inorganic polymeric water-retaining fertilizers according to the enterprise's standard Q/370203XYD 001-2016 and the industrial standard NY 886-2010 set forth in "Agro-Forestry Water-retaining Agent", it can be known, the range of the water absorbency of the fertilizer is 10.21 g/g-19.33 g/g, with an average being 17.5 g/g; the range of the absorbency for 0.9% NaCl solution of the fertilizer is 14.06 g/g-18.32 g/g, with an average being 16.56 g/g. In production practice, a water-retaining capacity of more than 5 g/g water absorbency would be valuable in actual applications.

Figure 3:
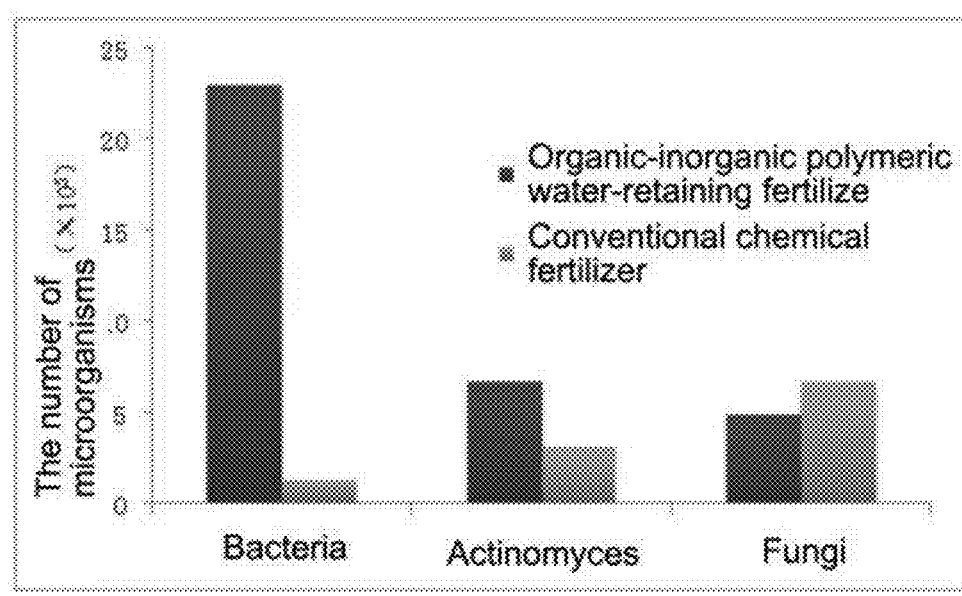
FIG. 3 shows a comparison of the number of microorganisms in the soil between the organic-inorganic polymeric water-retaining fertilizer of the present invention and an ordinary chemical fertilizer after being applied for three years.

The organic-inorganic polymeric water-retaining fertilizer prepared by the method of Example 4 as well as an ordinary fertilizer (without a biological enzyme) were applied to a soil. The number of microorganisms in the soil were counted and compared three years later. See FIG. 3 for the results.

In comparison to the conventional chemical fertilizer, after applying the above-mentioned organic-inorganic polymeric water-retaining fertilizer for three years continuously, the number of bacteria in the soil is increased to 17.69 times; the number of actinomyces is increased to 2.16 times, and the number of fungi decreased by ⅓. The benignant microbes in the soil are mainly bacteria and actinomyces, and the pathogenic microbes in the soil are mainly fungi.

Although the present invention has been illustrated and described with specific examples, it should be noted, however, that many other variations and modifications can be made without departing from the spirit and scope of the present invention. Therefore, the accompanying claims encompass all of these variations and modifications which belong to the scope of the present invention.

The invention claimed is:

1. An organic-inorganic polymeric water-retaining fertilizer, wherein said organic-inorganic polymeric water-retaining fertilizer is a co-polymer, said co-polymer is made by fusion and co-polymerization of an organic water-retaining monomer, an inorganic nutrient, a biological enzyme and a modifying agent under action of a catalyst, a cross-linking agent and an initiator, and said co-polymer is of a three-dimensional mesh-like hydrophilic group structure, said organic-inorganic polymeric water-retaining fertilizer, weighed in parts by weight, comprises: 400-600 parts of acrylic acid, 8900-9600 parts of inorganic nutrient, 50-100 parts of modifying agent and 5-15 parts of biological enzyme.

2. The organic-inorganic polymeric water-retaining fertilizer according to claim 1, wherein said organic-inorganic polymeric water-retaining fertilizer is made by fusion and co-polymerization of the organic water-retaining monomer, the biological enzyme and the inorganic nutrient; and said monomer comprises one selected from the group consisting of an acrylic acid and a derivative of the same.

3. The organic-inorganic polymeric water-retaining fertilizer according to claim 1, wherein said inorganic nutrient comprises one or more selected from the group consisting of calcium magnesium nitrate, urea, monoammonium phosphate, potassium salt, calcium nitrate, magnesium sulfate, zinc sulfate, sodium silicate and sodium borate; and said potassium salt comprises one selected from the group consisting of a potassium sulfate and a potassium chloride.

4. The organic-inorganic polymeric water-retaining fertilizer according to claim 1, wherein said biological enzyme comprises one or more selected from the group consisting of protease, cellulase, lipase, pectinase and an enzyme from enzyme microorganisms.

5. The organic-inorganic polymeric water-retaining fertilizer according to claim 1, wherein said modifying agent comprises two or more selected from the group consisting of protein powder, cellulase powder, pectin, lipid, starch, fish meal and bone meal.

6. The organic-inorganic polymeric water-retaining fertilizer according to claim 1, wherein said inorganic nutrient comprises the following components in parts by weight:
   1700-1800 parts of urea,
   1500-1600 parts of monoammonium phosphate,
   3500-3600 parts of potassium sulfate,
   1000-1100 parts of calcium nitrate,
   1000-1100 parts of magnesium sulfate,
   150-250 parts of sodium silicate,
   30-80 parts of zinc sulfate, and
   30-80 parts of sodium borate.

7. The organic-inorganic polymeric water-retaining fertilizer according to claim 1, wherein said fertilizer has a pH of 3-8, a mass fraction of organic matter of more than 20%, a water absorbency of 10 g/g-20 g/g; the total content of nitrogen, phosphorous and potassium is 35%-40%; the total content of calcium, magnesium, silicon and sulfur is greater than 5%.

8. A method for preparing the organic-inorganic polymeric water-retaining fertilizer according to claim 1, wherein after obtaining a neutralized pre-polymer from the organic water-retaining monomer under the action of the catalyst, the inorganic nutrient is added; then an initiator and a cross-linking agent are added, a solution is formed by stirring sufficiently; the modifying agent and the biological enzyme are added; a co-polymer is obtained after fusion and co-polymerization; and granulation and drying are carried out; said catalyst is an inorganic alkaline solution.

9. The method according to claim 8, wherein said method comprises steps of:
   1) mixing an acrylic acid and the catalyst, which react for 15-20 minutes to obtain the neutralized pre-polymer;
   2) sequentially adding the inorganic nutrients, the cross-linking agent and the initiator into the neutralized pre-polymer, which react for 15-25 minutes under a temperature controlled at 65° C.-70° C.; and lowering the temperature to 35° C.-55° C.;
   3) stirring the mixture obtained in step 2) to form a solution; adding into the solution the modifying agent and the biological enzyme, which are stirred for 10-20 minutes to obtain the co-polymer; and
   4) making said co-polymer into granules by drying, grinding and sieving.

10. A method for preparing the organic-inorganic polymeric water-retaining fertilizer according to claim 2, wherein after obtaining a neutralized pre-polymer from the organic water-retaining monomer under the action of the catalyst, the inorganic nutrient is added; then an initiator and a cross-linking agent are added, a solution is formed by stirring sufficiently; the modifying agent and the biological enzyme are added; a co-polymer is obtained after fusion and co-polymerization; and granulation and drying are carried out; said catalyst is an inorganic alkaline solution.

11. A method for preparing the organic-inorganic polymeric water-retaining fertilizer according to claim 3, wherein after obtaining a neutralized pre-polymer from the organic water-retaining monomer under the action of the catalyst, the inorganic nutrient is added; then an initiator and a cross-linking agent are added, a solution is formed by stirring sufficiently; the modifying agent and the biological enzyme are added; a co-polymer is obtained after fusion and co-polymerization; and granulation and drying are carried out; said catalyst is an inorganic alkaline solution.

12. A method for preparing the organic-inorganic polymeric water-retaining fertilizer according to claim 4, wherein after obtaining a neutralized pre-polymer from the organic water-retaining monomer under the action of the catalyst, the inorganic nutrient is added; then an initiator and a cross-linking agent are added, a solution is formed by stirring sufficiently; the modifying agent and the biological enzyme are added; a co-polymer is obtained after fusion and co-polymerization; and granulation and drying are carried out; said catalyst is an inorganic alkaline solution.

13. A method for preparing the organic-inorganic polymeric water-retaining fertilizer according to claim 5, wherein after obtaining a neutralized pre-polymer from the organic water-retaining monomer under the action of the catalyst, the inorganic nutrient is added; then an initiator and a cross-linking agent are added, a solution is formed by stirring sufficiently; the modifying agent and the biological enzyme are added; a co-polymer is obtained after fusion and co-polymerization; and granulation and drying are carried out; said catalyst is an inorganic alkaline solution.

14. A method for preparing the organic-inorganic polymeric water-retaining fertilizer according to claim 6, wherein after obtaining a neutralized pre-polymer from the organic water-retaining monomer under the action of the catalyst, the inorganic nutrient is added; then an initiator and a cross-linking agent are added, a solution is formed by stirring sufficiently; the modifying agent and the biological enzyme are added; a co-polymer is obtained after fusion and co-polymerization; and granulation and drying are carried out; said catalyst is an inorganic alkaline solution.

15. A method for preparing the organic-inorganic polymeric water-retaining fertilizer according to claim 7, wherein after obtaining a neutralized pre-polymer from the organic water-retaining monomer under the action of the catalyst, the inorganic nutrient is added; then an initiator and a cross-linking agent are added, a solution is formed by stirring sufficiently; the modifying agent and the biological enzyme are added; a co-polymer is obtained after fusion and co-polymerization; and granulation and drying are carried out; said catalyst is an inorganic alkaline solution.

* * * * *